United States Patent
Peng et al.

(10) Patent No.: US 8,897,201 B2
(45) Date of Patent: Nov. 25, 2014

(54) METHOD AND DEVICE FOR ACQUIRING CONTRIBUTION VALUE OF RELAY NODE

(75) Inventors: Jin Peng, Beijing (CN); Naibao Zhou, Beijing (CN); Xiaodong Duan, Beijing (CN); Yunfei Zhang, Beijing (CN); Yichuan Wu, Beijing (CN); Hongluan Liao, Beijing (CN)

(73) Assignee: China Mobile Communications Corporation, Beijing (CN)

( * ) Notice: Subject to any disclaimer, the term of this patent is extended or adjusted under 35 U.S.C. 154(b) by 763 days.

(21) Appl. No.: 13/202,432
(22) PCT Filed: Feb. 10, 2010
(86) PCT No.: PCT/CN2010/000187
§ 371 (c)(1),
(2), (4) Date: Aug. 19, 2011
(87) PCT Pub. No.: WO2010/094209
PCT Pub. Date: Aug. 26, 2010

(65) Prior Publication Data
US 2011/0299453 A1 Dec. 8, 2011

(30) Foreign Application Priority Data
Feb. 20, 2009 (CN) .......................... 2009 1 0078204

(51) Int. Cl.
H04B 7/14 (2006.01)
H04J 1/10 (2006.01)
H04J 3/08 (2006.01)
H04W 4/24 (2009.01)
H04L 12/14 (2006.01)
H04M 15/00 (2006.01)

(52) U.S. Cl.
CPC .................. *H04L 12/14* (2013.01); *H04W 4/24* (2013.01); *H04L 12/1403* (2013.01); *H04M 15/70* (2013.01); *H04M 15/73* (2013.01)
USPC ............................ 370/315; 370/492; 370/501

(58) Field of Classification Search
None
See application file for complete search history.

(56) References Cited

U.S. PATENT DOCUMENTS

2005/0025124 A1   2/2005  Mitsumori et al.
2005/0222948 A1 * 10/2005  Sato et al. ........................ 705/40

FOREIGN PATENT DOCUMENTS

CN   1510864   7/2004
CN   1798043   7/2006

OTHER PUBLICATIONS

International Search Report for PCT/CN2010/000187, mailed May 6, 2010.

* cited by examiner

*Primary Examiner* — Ashley Shivers
(74) *Attorney, Agent, or Firm* — Wokrman Nydegger

(57) ABSTRACT

A method and an apparatus for acquiring a contribution value of a transfer node are disclosed. The method includes: acquiring charging information of a trust node which is in a trust network circumstance and joining in a session, and acquiring charging information of the transfer node which is in a distrust network circumstance and joining in the session; auditing the consistency of charging information between the transfer node and the trust node; computing the contribution value of the transfer node according to the auditing result and the charging information of the transfer node. The invention can effectively guarantee acquiring the contribution value of the transfer node truly and unfailingly in a distrust circumstance of network circumstance, and subsequently providing basis for rewarding the node which has contributed for transferring.

13 Claims, 3 Drawing Sheets

METHOD AND DEVICE FOR ACQUIRING CONTRIBUTION VALUE OF RELAY NODE

CROSS-REFERENCE TO RELATED APPLICATIONS

The present application is a US National Stage of International Application No. PCT/CN2010/000187, filed 10 Feb. 2010, designating the United States, and claiming priority to Chinese Patent Application No. 200910078204.6 filed 20 Feb. 2009. The contents of the foregoing applications are hereby incorporated herein by reference in their entireties.

FIELD OF THE INVENTION

The present invention relates to the field of Internet and particularly to a method and device for acquiring a contribution value of a relay node.

BACKGROUND OF THE INVENTION

Smooth communication can not be maintained between communication nodes due to a quality problem of a network under a complex network condition. In this situation, a forwarding mechanism may be adopted in a system by selecting another node in the network as a relay node for both of the communication parties to achieve the purpose of traffic relaying and further improve the quality of communication. A service has to be performed by adopting the forwarding mechanism in the case that a direct connection can not be offered or the effect of a connection can not satisfy a corresponding service demand (e.g., due to an excessive delay) in a P2P system. A specific method is as follows.

(1) A global tracker server is arranged to record status information of active super nodes and terminal nodes so as to support a service of charging, etc., on one hand, and to schedule a relay node on the other hand. In the case that a direct connection can not be offered or the effect of a connection can not satisfy a fundamental service demand, the tracker server schedules an appropriate super node or terminal node for a node requesting for a relay service according to load information of the super nodes and a Landmark distribution (GUID values) of the terminal nodes.

(2) A super node is adopted for relaying: for both of communication parties (e.g., a UE Bob and a UE Alice in communication), the most appropriate one (e.g., an SN C) is selected from all or a part of super nodes as a relay party of the session over a link connection of UE Bob-SN C-UE Alice or vice versa so that the SN C is responsible for forwarding session data between the UE Bob and the UE Alice. The SN C is selected so that the quality across the relay path of UE Bob-SN C-UE Alice shall better satisfy the service demand while achieving a load balance.

(3) A relay terminal node is adopted for relaying: a part of general terminal nodes can enable a better connection between nodes in two domains and have the features of online stability, a powerful capability, etc., so this part of general terminal nodes act as relay terminal nodes. The relay terminal node shall report periodically its load condition and heartbeat information to the tracker server and whether it acts as a relay party is determined as scheduled by the tracker server in the case that a relay function is required when a general terminal node initiates a session.

Skype-like software has become a popular communication means at present due to its clear sound quality, low cost, versatility and convenience to use. For transmission of a file by using the Skype, if a direct connection fails between two parties, relaying may be performed via a resource of another user. Relay is typically performed through a server when a direct connection fails with the same kind of software, but relay is performed for Skype through another terminal node in the network without making use of any resource of a server.

In the foregoing method, a general relay node contributes to network traffic relaying and is necessarily awarded on a precondition that the contribution of the general relay node to traffic relaying is acquired. However, the general relay node is usually located in a non-trusted network environment, so contribution information acquired separately at the system side from the general relay node may not be reliable, since there is a possibility that a general node without any contribution to traffic relaying may deceive the system side.

The inventors have identified, during making the invention, the following problem in the prior art: the relay mechanism has been widely adopted over the Internet, but a method and device for acquiring truly and reliably a contribution value of a node performing a relay function in a non-trusted network environment have not been proposed.

SUMMARY OF THE INVENTION

An object of the invention is to address the issue of acquiring a contribution value of a relay node by proposing a method and device for acquiring a contribution value of a relay node to acquire truly and reliably the contribution value of the relay node in the case that the relay node is located in a non-trusted network environment.

In order to attain the foregoing object, there is provided a method for acquiring a contribution value of a relay node according to an aspect of the invention, which includes: acquiring charging information of a trusted node located in a trusted network environment participating in a session and charging information of a relay node located in a non-trusted network environment participating in the session; verifying the charging information of the relay node and the charging information of the trusted node for consistency; and calculating the contribution value of the relay node according to the verified results and the charging information of the relay node.

In the present technical solution, the charging information includes duration of the session and/or network traffic. The step of calculating the contribution value of the relay node according to the verified results and the charging information of the relay node includes: calculating the contribution value of the relay node according to the duration of the session and/or the network traffic in the charging information of the relay node when the charging information of the relay node is consistent with the charging information of the trusted node; or taking the charging information of the relay node not as a criterion for calculating the contribution value of the relay node when the charging information of the relay node is inconsistent with the charging information of the trusted node.

In the present technical solution, the charging information further includes any one or combination of: a session initiator, a session receiver, start time of the session, end time of the session and a session sequence number.

Preferably, the present technical solution, before verifying the charging information of the relay node and the charging information of the trusted node for consistency, further includes: converting the charging information of the trusted node and the charging information of the relay node into a uniform format when the charging information of the relay node is in a format inconsistent with the charging information of the trusted node.

In the present technical solution, the step of acquiring charging information of a relay node located in a non-trusted network environment participating in the session includes: acquiring the charging information of the relay node according to a charging request message transmitted from the relay node; or acquiring the charging information of the relay node through an FTP.

In the present technical solution, the step of acquiring charging information of a trusted node located in a trusted network environment participating in a session includes: acquiring the charging information of the trusted node according to a charging request message transmitted from the trusted node; or acquiring the charging information of the trusted node through the FTP.

Preferably, in the present technical solution, the trusted node is a super node participating in the session.

Preferably, in the present technical solution, the super node includes at least one of a super node responsible for processing the session for a session initiator and a super node responsible for processing the session for a session receiver.

In order to attain the foregoing object, there is provided a device for acquiring a contribution value of a relay node according to another aspect of the invention, which includes: an acquiring module configured to acquire charging information of a trusted node located in a trusted network environment and of a relay node located in a non-trusted network environment, both of the trusted node and the relay node participate in a session; a verifying module configured to verify the charging information of the relay node and the charging information of the trusted node for consistency; and a calculating module configured to calculate the contribution value of the relay node according to the verified results and the charging information of the relay node when the charging information of the relay node is consistent with the charging information of the trusted node.

Preferably, in the present technical solution, the device for acquiring a contribution value of a relay node may further include a converting module configured to convert the charging information of the trusted node and the charging information of the relay node into a uniform format when the charging information of the trusted node is in a format inconsistent with the charging information of the relay node.

In the method and device for acquiring a contribution value of a relay node according to the embodiments of the invention, the charging information of the trusted node in the trusted network environment and the charging information of the relay node in the non-trusted network environment are associated, and the charging information of the relay node is deemed trusted in the case that the provided charging information is consistent. Therefore, the embodiments of the invention can effectively ensure true and reliable acquisition of the contribution value of the relay node in the non-trusted network environment to provide a criterion for a subsequent award to the node contributing to relaying.

The other features and advantages of the invention will be set forth in the following specification and will become apparent partly from the specification or be appreciated from practicing the invention. The object and the other advantages of the invention can be attained and achieved in the specification, the claims and structures pointed out particularly in the drawings.

The technical solutions of the invention will be further described hereinafter with reference to the drawings and the embodiments.

BRIEF DESCRIPTION OF THE DRAWINGS

The drawings are intended to provide further understanding of the invention, constitute a part of the specification and server together with the embodiments of the invention to explain but not limit the invention, in the drawings.

Figure 1:
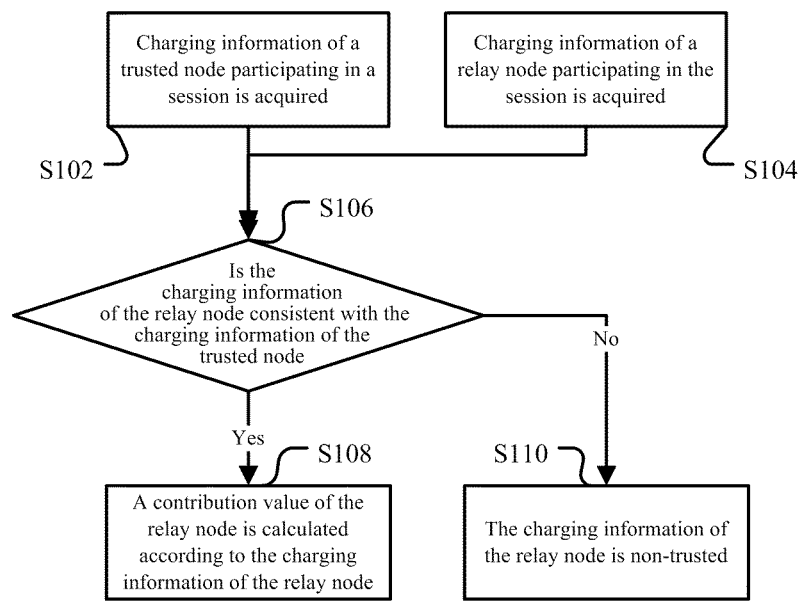
FIG. 1 is a flow chart of a method for acquiring a contribution value of a relay node according to a first embodiment of the invention.

The following reference numerals are indicated in the drawings:

302—acquiring module
304—verifying module
306—calculating module
308—converting module

DETAILED DESCRIPTION OF THE EMBODIMENTS

The embodiments of the invention will be described below with reference to the drawings. It shall be understood that the embodiments described here are merely intended to illustrate and explain but not limit the invention.

A First Embodiment

In the present embodiment and the following embodiments, the precondition is that a trusted node is located in a trusted network environment and a relay node is located in a non-trusted network environment. FIG. 1 is a flow chart of a method for acquiring a contribution value of a relay node according to the first embodiment of the invention. As illustrated in FIG. 1, the present embodiment includes the following steps.

Step S102: Charging information of a trusted node participating in a session is acquired.

Step S104: Charging information of a relay node participating in the session is acquired.

Step S106: It is determined whether the charging information of the relay node is consistent with the charging information of the trusted node, and if so, the flow goes to Step S108; otherwise, the flow goes to Step S110.

Step S108: A contribution value of the relay node is calculated according to the charging information of the relay node, and the flow ends.

Step S110: The charging information of the relay node is non-trusted and cannot be used for calculating the contribution value of the relay node, and the flow ends.

In the present embodiment, the charging information includes duration of the session and/or network traffic, where the network traffic may be deducted under a codec principle used for the session and acquired by being really measured, and the duration of the session may be represented with start time and end time of the session. Furthermore, the charging information may further include a session initiator, a session receiver, the start time of the session, the end time of the session, and a session sequence number.

In the present embodiment, the system calculates the contribution value of the relay node according to the duration of the session and/or the network traffic recorded in the charging information of the relay node, for example, one contribution value is acquired for a 10-hour relay duration or 100M relay network traffic; or the contribution value is calculated as per a specific rule.

In the present embodiment, in the step of "determining whether the charging information of the relay node is consistent with the charging information of the trusted node", "consistent" means that a preset index or a result of calculating a relevant index is the same or an error of an index is within a preset range.

In the present embodiment, it is determined whether the charging information of the relay node is consistent with the charging information of the trusted node by verifying several corresponding indexes preset in the system, for example, three indexes including the session initiator, the session receiver and the duration of the session are preset in the system for verifying, and then the charging information of the relay node is deemed trusted and the contribution value of the relay node is calculated according to the charging information when all of the three indexes are consistent between the charging information of the trusted node and the relay node.

In the present embodiment, since the charging information of the trusted node is consistent with the charging information of the relay node, the contribution value is calculated according to the charging information of the relay node, which is essentially the same as calculation of the contribution value according to the charging information of the trusted node, both of which shall come into the scope of the invention.

In the present embodiment, the trusted node may be a super node participating in the session and particularly a super node responsible for processing the session for the session initiator and a super node responsible for processing the session for the session receiver or either of them.

In the present embodiment, a charging center may acquire the charging information according to a charging request (ACR) message transmitted from the trusted node and/or the relay node. Alternatively, the charging information may be acquired through an FTP.

In the present embodiment, when the charging information of the trusted node and the relay node is in inconsistent formats because the trusted node and the relay node submit the charging information in different modes or due to another reason, the charging center may further convert the charging information of the trusted node and the relay node into a uniform format and then determine whether the charging information is consistent. For example, the relay duration is recorded in the charging information of the relay node, and the start time and the end time of the session are recorded in the charging information of the super node, and then the system may calculate the duration of the session for the super node according to a presetting, compare the duration of the session with the relay duration reported by the relay node and further determine whether the charging information reported by the relay node is trusted.

In order to acquire the contribution value of the relay node in the method according to the present embodiment, the charging information of the trusted node and the relay node participating in the session is verified, and when both of them is consistent, the charging information of the relay node is deemed trusted, and the contribution value of the relay node is calculated according to the charging information of the relay node. The method according to the present embodiment can ensure effectively that the contribution value of the relay node is acquired truly and reliably in the case that the relay node is located in a non-trusted network environment to thereby prevent the charging center from being deceived by any false contribution of the relay node.

A Second Embodiment

Figure 2:
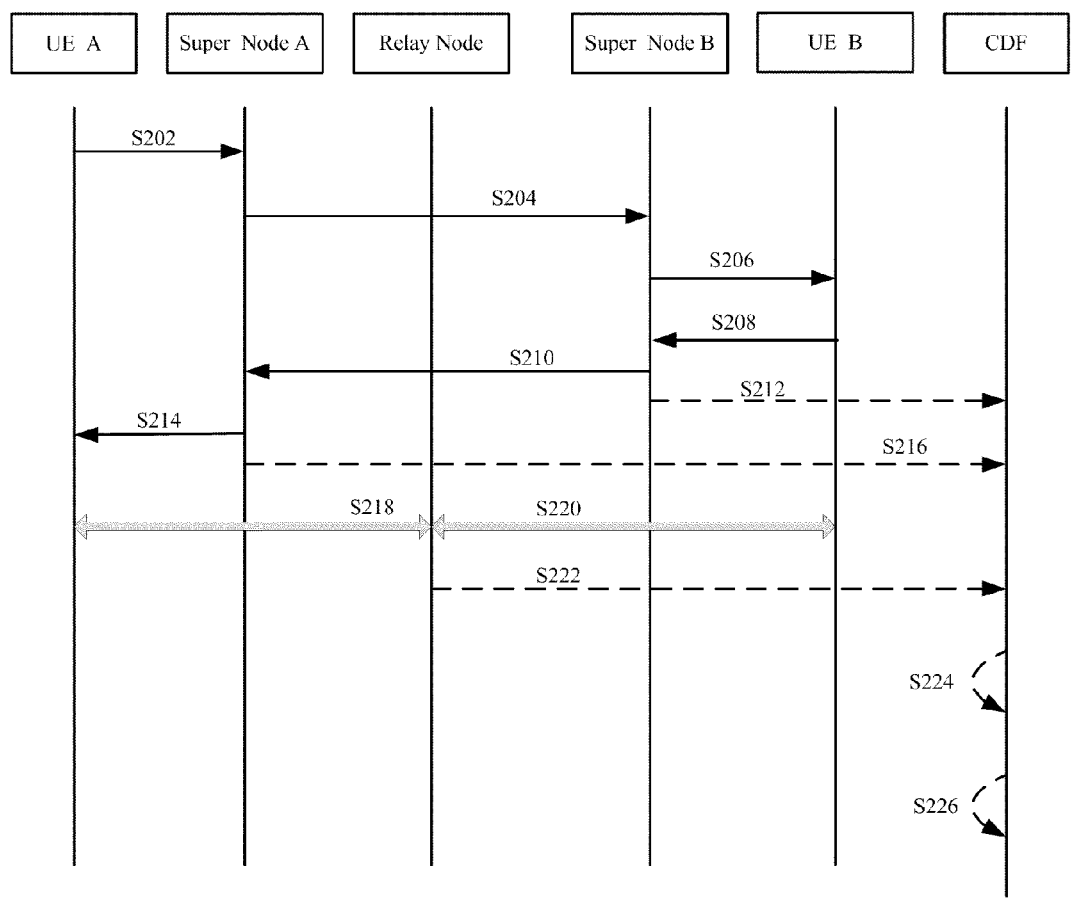
FIG. 2 is a flow chart of a method for acquiring a contribution value of a relay node according to a second embodiment of the invention.

A signaling flow of relay charging will be detailed in the present embodiment. Devices involved in the present embodiment includes a User Equipment A (UE A), a super node A responsible for processing a session for the UE A, a relay node, a User Equipment B (UE B), a super node B responsible for processing a session for the UE B and a Charging Data Function (CDF) center. FIG. 2 is a flow chart of a method for acquiring a contribution value of a relay node according to the second embodiment of the invention. As illustrated in FIG. 2, the present embodiment includes the following steps.

Step S202: A user A intends to communicate with a user B, and then the UE A transmits an INVITE message to the super node A responsible for processing a session for the UE A.

Step S204: The super node A searches through P2P Overlay the super node B where the UE B is located and transmits the INVITE message to the super node B.

Step S206: The super node B transmits the INVITE message to the UE B.

Step S208: The UE B transmits a 200 OK message to the super node B after the called user hooks off.

Step S210: The super node B transmits the 200 OK message to the super node A.

Step S212: The super node B transmits an ACR message to the CDF to start charging while submitting relevant charging information to the CDF.

Step S214: The super node A transmits the 200 OK message to the UE A.

Step S216: The super node A transmits an ACR message to the CDF to start charging while submitting relevant charging information to the CDF.

Step S218: The UE A transmits an RTP information stream to the relay node.

Step S220: The relay node relays the RTP information stream to the UE B.

Step S222: The relay node transmits an ACR message to the CDF to start charging while submitting relevant charging information to the CDF.

Step S224: It is determined whether the charging information of the relay node is consistent with the charging information of the super node A/B.

Step S226: If indexes in the charging information of the relay node, e.g., the session initiator/receiver, the relay start time/end time, the relay duration, and network traffic, are consistent with corresponding indexes in the charging information of the super node A and the super node B, e.g., the session initiator/receiver, the start time/end time of the session, the duration of the session, and network traffic, this indicates that the charging information provided by the relay node selected in this session is trusted and can be used as a criterion for charging; otherwise, it can not be used as a criterion for charging, and other means, e.g., reporting a deceit, or tracking, may be taken.

In the present embodiment, the global tracker server schedules the relay node as in the prior art and has not been illustrated in FIG. 2 for the sake of clarity. Realtime charging or non-realtime charging may be adopted when the super node and/or the relay node submits the relevant charging information. For non-realtime charging, the super node and/or the relay node submits all the charging information by transmitting the ACR message to the CDF at the end of the session. The two charging scenarios are slightly different in their signaling flows and both of them are the same as in the prior art, so a repeated description thereof will be omitted here.

The present embodiment further details the implementation steps based upon the first embodiment. The method according to the present embodiment has all the advantageous effects of the first embodiment and is more practicable.

A Third Embodiment

Figure 3:
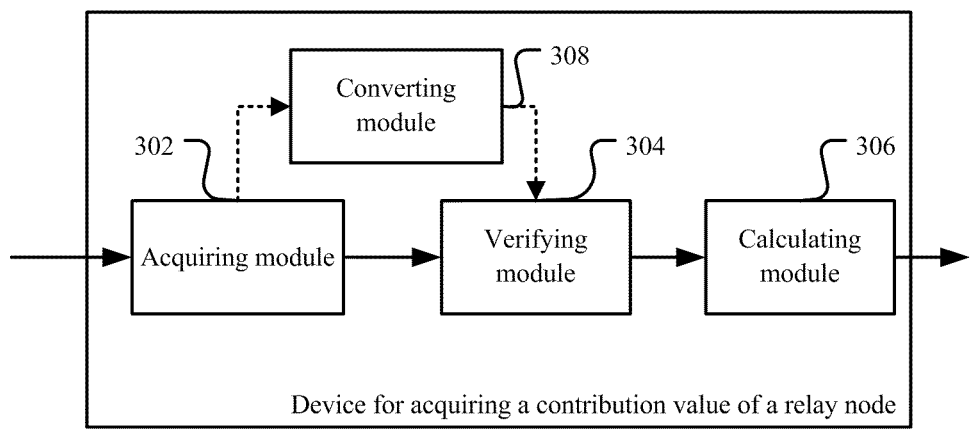
FIG. 3 is a schematic diagram of a device for acquiring a contribution value of a relay node according to a third embodiment of the invention.

FIG. 3 is a schematic diagram of a device for acquiring a contribution value of a relay node according to the third embodiment of the invention. As illustrated in FIG. 3, the present embodiment includes: an acquiring module 302 configured to acquire charging information of a trusted node located in a trusted network environment and of a relay node located in a non-trusted network environment, both of which participate in a session; a verifying module 304 configured to verify the charging information of the relay node and the charging information of the trusted node for consistency; and a calculating module 306 configured to calculate a contribution value of the relay node according to the verified results and the charging information of the relay node when the charging information of the relay node is consistent with the charging information of the trusted node, that is, calculate the contribution value of the relay node according to relay traffic and/or relay duration reported by the relay node by a specific rule when the charging information of the relay node is consistent with the charging information of the trusted node.

In the present embodiment, the device for acquiring the contribution value of the relay node may further include a converting module 308 configured to convert the charging information of the trusted node and the charging information of the relay node into a uniform format when the charging information of the trusted node is in a format inconsistent with the charging information of the relay node.

In the present embodiment, the trusted node includes one of a super node responsible for processing the session for a session initiator and a super node responsible for processing the session for a session receiver.

In a 3G application environment, it is sufficient to modify correspondingly the device according to the present embodiment and the implementing flows according to the foregoing embodiments without departing from the scope of the invention. For details of a method performed according to the present embodiment, reference can be made to the relevant description of the first embodiment. The present embodiment has all the advantageous effects of the first embodiment, so a repeated description thereof will be omitted here.

Those ordinarily skilled in the art can appreciate that all or a part of the steps in the embodiments of the method may be performed with a program instructing relevant hardware, which may be stored in a readable storage medium and which when being executed can perform the steps in the embodiments of the method, where the storage medium includes various mediums in which program codes can be stored, including an ROM, an RAM, a magnetic disk, an optical disk, a network node, and a scheduler.

It shall be noted that the foregoing description is merely illustrative of the preferred embodiments of the invention but not intended to limit the invention and although the invention has been detailed in connection with the embodiments, those skilled in the art can make modifications to the technical solutions recited in the embodiments or equivalent substitutions of a part of technical features thereof. Any modifications, equivalent substitutions, and adaptations made without departing from the principle of the invention shall come into the scope of the invention.

The invention claimed is:

1. A method for acquiring a contribution value of a relay node, comprising:
    acquiring charging information of a trusted node located in a trusted network environment participating in a session and charging information of a relay node located in a non-trusted network environment participating in the session;
    verifying the charging information of the relay node and the charging information of the trusted node for consistency;
    calculating the contribution value of the relay node according to a duration of the session and/or network traffic in the charging information of the relay node when the charging information of the relay node is consistent with the charging information of the trusted node; and
    taking the charging information of the relay node not as a criterion for calculating the contribution value of the relay node when the charging information of the relay node is inconsistent with the charging information of the trusted node.

2. The method of claim 1, wherein the charging information further comprises any one or combination of:
    an initiator of the session, a receiver of the session, start time of the session, end time of the session and a session sequence number.

3. The method of claim 2, further comprising: before verifying the charging information of the relay node and the charging information of the trusted node for consistency,
    converting the charging information of the trusted node and the charging information of the relay node into a uniform format when the charging information of the relay node is in a format inconsistent with the charging information of the trusted node.

4. The method of claim 2, wherein acquiring charging information of a relay node located in a non-trusted network environment participating in the session comprises:
    acquiring the charging information of the relay node according to a charging request message transmitted from the relay node; or
    acquiring the charging information of the relay node through an FTP.

5. The method of claim 2, wherein acquiring charging information of a trusted node located in a trusted network environment participating in a session comprises:
    acquiring the charging information of the trusted node according to a charging request message transmitted from the trusted node; or
    acquiring the charging information of the trusted node through an FTP.

6. The method of claim 1, further comprising: before verifying the charging
    information of the relay node and the charging information of the trusted node for consistency,
    converting the charging information of the trusted node and the charging information of the relay node into a uniform format when the charging information of the relay node is in a format inconsistent with the charging information of the trusted node.

7. The method of claim 1, wherein acquiring charging information of a relay node located in a non-trusted network environment participating in the session comprises:
    acquiring the charging information of the relay node according to a charging request message transmitted from the relay node; or
    acquiring the charging information of the relay node through an FTP.

8. The method of claim 1, wherein acquiring charging information of a trusted node located in a trusted network environment participating in a session comprises:
    acquiring the charging information of the trusted node according to a charging request message transmitted from the trusted node; or
    acquiring the charging information of the trusted node through an FTP.

9. The method of claim 1, wherein the trusted node is a super node participating in the session.

10. The method of claim 9, wherein the super node comprises at least one of:
    a super node responsible for a session initiator; and
    a super node responsible for a session receiver.

11. A non-transitory readable storage medium for acquiring a contribution value of a relay node, which when executed can perform the method comprising:

acquiring charging information of a trusted node located in a trusted network environment and of a relay node located in a non-trusted network environment, both of the trusted node and the relay node participate in a session;

verifying the charging information of the relay node and the charging information of the trusted node for consistency;

calculating the contribution value of the relay node according to a duration of the session and/or network traffic in the charging information of the relay node when the charging information of the relay node is consistent with the charging information of the trusted node; and taking the charging information of the relay node not as a criterion for calculating the contribution value of the relay node when the charging information of the relay node is inconsistent with the charging information of the trusted node.

12. The non-transitory readable storage medium of claim 11, further comprising:

converting the charging information of the trusted node and the charging information of the relay node into a uniform format when the charging information of the trusted node is in a format inconsistent with the charging information of the relay node.

13. The non-transitory readable storage medium of claim 11, wherein the trusted node comprises at least one of:

a super node responsible for a session initiator; and
a super node responsible for a session receiver.

\* \* \* \* \*